(12) United States Patent
Dvorkis et al.

(10) Patent No.: US 6,708,886 B2
(45) Date of Patent: *Mar. 23, 2004

(54) HIGH SPEED SCANNING ARRANGEMENTS

(75) Inventors: Paul Dvorkis, Stony Brook, NY (US); Howard Shepard, Great Neck, NY (US); Simon Bard, Stony Brook, NY (US); Joseph Katz, Stony Brook, NY (US); Edward Barkan, Setauket, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/170,177

(22) Filed: Jun. 12, 2002

(65) Prior Publication Data

US 2003/0010826 A1 Jan. 16, 2003

Related U.S. Application Data

(62) Division of application No. 09/791,206, filed on Feb. 23, 2001, now Pat. No. 6,439,461, which is a continuation of application No. 08/719,597, filed on Sep. 25, 1996, now abandoned, which is a division of application No. 08/474,415, filed on Jun. 7, 1995, now abandoned, which is a continuation of application No. 08/108,521, filed on Jul. 19, 1993, now abandoned, which is a division of application No. 07/868,401, filed on Apr. 14, 1992, now Pat. No. 5,280,165, which is a division of application No. 07/520,464, filed on May 8, 1990, now Pat. No. 5,168,149.

(51) Int. Cl.[7] .................................................. G06K 7/10
(52) U.S. Cl. .............................. 235/462.43; 235/462.33
(58) Field of Search ....................... 235/462.33, 462.36, 235/462.38, 462.43

(56) References Cited

U.S. PATENT DOCUMENTS 5,329,103 A * 7/1994 Rando .................. 235/462.36
5,874,720 A * 2/1999 Dvorkis et al. ........ 235/462.32

* cited by examiner

*Primary Examiner*—Karl D. Frech
(74) *Attorney, Agent, or Firm*—Kirschstein, et al.

(57) ABSTRACT

High speed scanning arrangements in scanners for reading bar code symbols by oscillating a scanner component in single or multi-axis scan patterns.

11 Claims, 8 Drawing Sheets

HIGH SPEED SCANNING ARRANGEMENTS

CROSS-REFERENCE TO RELATED APPLICATIONS

This application is a division of U.S. patent application Ser. No. 09/791,206, filed Feb. 23, 2001, now allowed U.S. Pat. No. 6,439,461, which is a continuation of U.S. patent application Ser. No. 08/719,597, filed Sep. 25, 1996, now abandoned, which is a division of U.S. patent application Ser. No. 08/474,415, filed Jun. 7, 1995, now abandoned, which is a continuation of U.S. patent application Ser. No. 08/108,521, filed Jul. 19, 1993, now abandoned, which is a division of U.S. patent application Ser. No. 07/868,401, filed Apr. 14, 1992, now U.S. Pat. No. 5,280,165, which is a division of U.S. patent application Ser. No. 07/520,464, filed May 8, 1990, now U.S. Pat. No. 5,168,149.

BACKGROUND OF THE INVENTION

1. Field of the Invention

This invention generally relates to a scanning arrangement in a scanner operative for repetitively scanning indicia having parts of different light reflectivity, for example, bar code symbols, and, more particularly, to operating such a scanning arrangement at high speeds in single or multi-axis scan patterns.

2. Description of the Related Art

Various optical readers and optical scanners have been developed heretofore to optically read bar code symbols applied to objects in order to identify the object by optically reading the symbol thereon. The bar code symbol itself is a coded pattern comprised of a series of bars of various widths and spaced apart from one another to bound spaces of various widths, the bars and spaces having different light reflecting properties. The readers and scanners electro-optically decoded the coded patterns to multiple digit representations descriptive of the objects. Scanners of this general type have been disclosed, for example, in U.S. Pat. Nos. 4,251,798; 4,360,798; 4,369,361; 4,387,297; 4,593,186; 4,496,831; 4,409,470; 4,808,804; 4,816,661; 4,816,660; and 4,871,904, all of said patents having been assigned to the same assignee as the instant invention and being hereby incorporated herein by reference.

As disclosed in the above-identified patents and applications, a particularly advantageous embodiment of such a scanner resided, inter alia, in emitting a light beam, preferably a laser beam, emitted from a light source, preferably a gas laser or a laser diode, and in directing the laser beam to a symbol to be read. En route to the symbol, the laser beam was directed to, and reflected off, a light reflector of a scanning component. The scanning component moved the reflector in a cyclical fashion and caused the laser beam to repetitively scan the symbol. The symbol reflected the laser beam incident thereon. A portion of the incident light reflected off the symbol was collected and detected by a detector component, e.g. a photodiode, of the scanner. The photodiode had a field of view, and the detected light over the field of view was decoded by electrical decode circuitry into data descriptive of the symbol for subsequent processing. The cyclically movable reflector swept the laser beam across the symbol and/or swept the field of view during scanning.

U.S. Pat. Nos. 4,387,297 and 4,496,831 disclose a high-speed scanning component including an electric motor operative for reciprocatingly oscillating a reflector in opposite circumferential directions relative to an output shaft of the motor. Electrical power is continuously applied to the motor during scanning. The light beam which impinges on the light reflector is rapidly swept across a symbol to b e scanned in a predetermined cyclical manner. The scanning component comprises at least one scan means for sweeping t he symbol along a predetermined direction (X-axis) lengthwise thereof. The scanning component may also comprise another scan means for sweeping the symbol along a transverse direction (Y-axis) w which is substantially orthogonal to the predetermined direction, to thereby generate a raster-type scan pattern over the symbol. In addition to a single scan line and the raster-type pattern, other types of scan patterns are also possible, such h as, x-shaped, Lissajous, curvilinear (see U.S. Pat. No. 4,871,904), etc. For example, if the X and Y axis scanning motors are both driven such that the light reflectors are driven at a sinusoidally-varying rate of speed, then the scan pattern at the reference plane will be a Lissajous-type pattern for omni-directional scanning of the symbols. The use of two separate scanning motors and control means to produce the multi-axis and omni-directional scanning pattern increases material and labor costs as well as the amount of electrical power needed to operate the scanner. In addition, the relatively complicated motor shaft and bearing arrangements of the scanning components may result in a useful life that is inadequate for some applications. Furthermore, the scanning components disclosed in U.S. Pat. Nos. 4,387,297 and 4,496,831 are designed for miniature light reflectors and are not well suited for large scale reflectors.

SUMMARY OF THE INVENTION

Objects of the Invention

It is a general object of this invention to advance the state of the art of scanners for reading indicia of different light reflectivity, particularly laser scanners for reading bar code symbols.

An additional object of this invention is to provide novel high-speed scanning elements and novel scanning methods of operation.

Yet another object of this invention is to conveniently generate single line, multi-line or omni-directional scan patterns with the same scanning elements.

A further object of this invention is to provide a scanning arrangement having an increased scan line amplitude.

It is another object of this invention to minimize the number of elements comprising the scanning component.

Another object of this invention is to increase the working lifetime of the scanning components.

Features of the Invention

In keeping with these objects, and others which will become apparent hereinafter, this invention resides, briefly stated, in an arrangement for, and a method of, scanning indicia having parts of different light reflectivity by directing light toward the indicia and by collecting reflected light returning from the indicia. This invention comprises a scanner component supported by holder means for angular oscillating movement in a single scan direction between a pair of scan end positions or alternatively, in first and second scan directions between first and second pairs of scan end positions. According to this invention, read-start means are provided for moving the component between the scan end positions.

In one feature, the component is simultaneously angularly oscillated between the first and second pair of scan end positions for directing light along the first and second scan directions to thereby effect a multi-directional scan pattern over the indicia.

In one embodiment, the holder means is a planar leaf spring having opposite ends anchored and the scanner component mounted on a bent central portion of the spring. The read start means is comprised of a permanent magnet mounted to the holder and an electromagnetic coil for displacing the magnet in response to a driving signal. By energizing the-nearby coil, the magnet and, in turn, the scanner component are oscillated, preferably at the resonant frequency of the component/magnet assembly.

In another embodiment, the holder means is a tuning fork having a permanent magnet fixedly mounted on one arm of the fork and the scanner component fixedly mounted on the other arm. The read-start means is comprised of a n electromagnetic coil for displacing the magnet and, in turn, for oscillating the scanner component in a scan which extends in the first direction over the indicia. The stem of the fork may also be oscillated by a second read-start means comprised of a stepper motor to scan the indicia in the second direction generally perpendicular to the first direction to effect two-dimesional scanning.

In a further embodiment of the present invention, a two-dimensional scan pattern over the indicia is advantageously effected by a holder means that is constructed for mounting the component for angular oscillating movement along first and second axes in response to a single read-start means.

In one embodiment, the first and second vibratory means are mounted in orthogonal planes relative to each other and cooperate for angular oscillatory movement of the component about the first and second axes. The first vibratory means is constructed to vibrate at a high range of frequencies and the second vibratory means is constructed to vibrate at a low range of frequencies in response to a driving signal. The driving signal is comprised of a superposition of a first A.C. signal within the high frequency range and a second A.C. signal within the low frequency range to thereby effect a two-axis raster-type scan pattern. In this embodiment, the first vibratory means is a generally U-shaped leaf spring having a permanent magnet mounted on one arm and the scanner component mounted on the other arm, and the second vibratory means is a generally planar leaf spring having one end secured to the arm of the U-shaped spring having the magnet and the other end secured to a base forming a vibration pivot line. The superimposed driving signal is supplied to an electromagnetic coil for displacing the magnet and, in turn, for oscillating the scanner component in two orthogonal scan directions over the indicia to form the raster pattern. In an alternative embodiment, the second vibratory means includes a generally S-shaped leaf spring secured to the planar leaf spring.

In another embodiment of a two-axis raster-type scan arrangement, the holder means includes a generally planar leaf spring having one end secured to a base to form a vibration pivot line and the component mounted on the free end of the spring. The center of mass of the component is offset from the axis formed by an electromagnetic coil and a magnet mounted to the leaf spring. The offset center of mass of the component provides a restoring force to torsionally vibrate the planar spring along the first scan direction at a high range of frequencies and the leaf spring vibrates about the pivot line along the second scan direction at a low range of frequencies to effect the raster-type scan pattern over the indicia in response to a superimposed high and low frequency driving signal.

In another feature of the invention, an omni-directional scan pattern over the indicia is provided. First and second vibratory means are arranged such that in response to a superposition of driving signals having a frequency ratio relative to each other of 5:1 or less, a Lissajous scan pattern is effected. The first vibratory means is a generally U-shaped leaf spring in which one arm is mounted to the component and the other arm is mounted to the second vibratory means which includes a generally planar leaf spring secured to the base forming a pivot line. The leaf spring includes a permanent magnet mounted on one side that cooperates with an electromagnetic coil. Mounted on the other side of the leaf spring is the U-shaped spring with the component. The direction of vibration of the leaf spring about the pivot line and the direction of vibration of the U-shaped spring are the same. In this embodiment, the weight of the U-shaped spring and component results in a torsional vibration of the planar spring for oscillating the component along one scan direction and the vibration of the leaf spring about the pivot point results in the component being oscillated along a second scan direction. The simultaneous vibration in the two axes generated by the 5 to 1 or less frequency superimposed driving signal provides the Lissajous scan pattern.

In an improved construction of the U-shaped spring comprising the holder means in the various embodiments described above, the angular amplitude of the scan line produced by the U-shaped spring is increased by providing the spring with asymmetrically dimensioned arms. The asymmetrically dimensioned construction may be implemented to increase the angular amplitude in either a one or two axis scan arrangement.

In a further feature of the present invention, various improvements in the means for providing the necessary restoring force to repeatably oscillate the compound between scan end positions is provided.

In one embodiment, the read-start means includes a magnetic return means that provides a spring-like restoring force for oscillating the component between scan end positions. The magnetic return means includes a stationary permeable magnetic core positioned adjacent a movable permanent magnet at an equilibrium position. The magnet is operatively connected to the component for moving the component between scan end positions. The permanent magnet is alternately attracted to and repelled from an electromagnetic coil when the coil is energized by an alternating current driving signal. During actuation of the coil, the magnet passes back and forth over the core which alternately magnetizes the core with a polarity opposite to the side of the magnet facing the core thereby creating a magnetic restoring force causing the magnet to return to the equilibrium position over the center of the core. In a further embodiment, a second electromagnetic coil may be provided in operative arrangement with the core to strengthen the magnetic field of the core. Alternatively, the core may be formed of a permanent magnet material.

In another feature of the invention, the restoring means may be in the form of an elastic member, such as a room temperature vulcanizer, attached to the component that acts like a spring to restore the component to the rest position.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
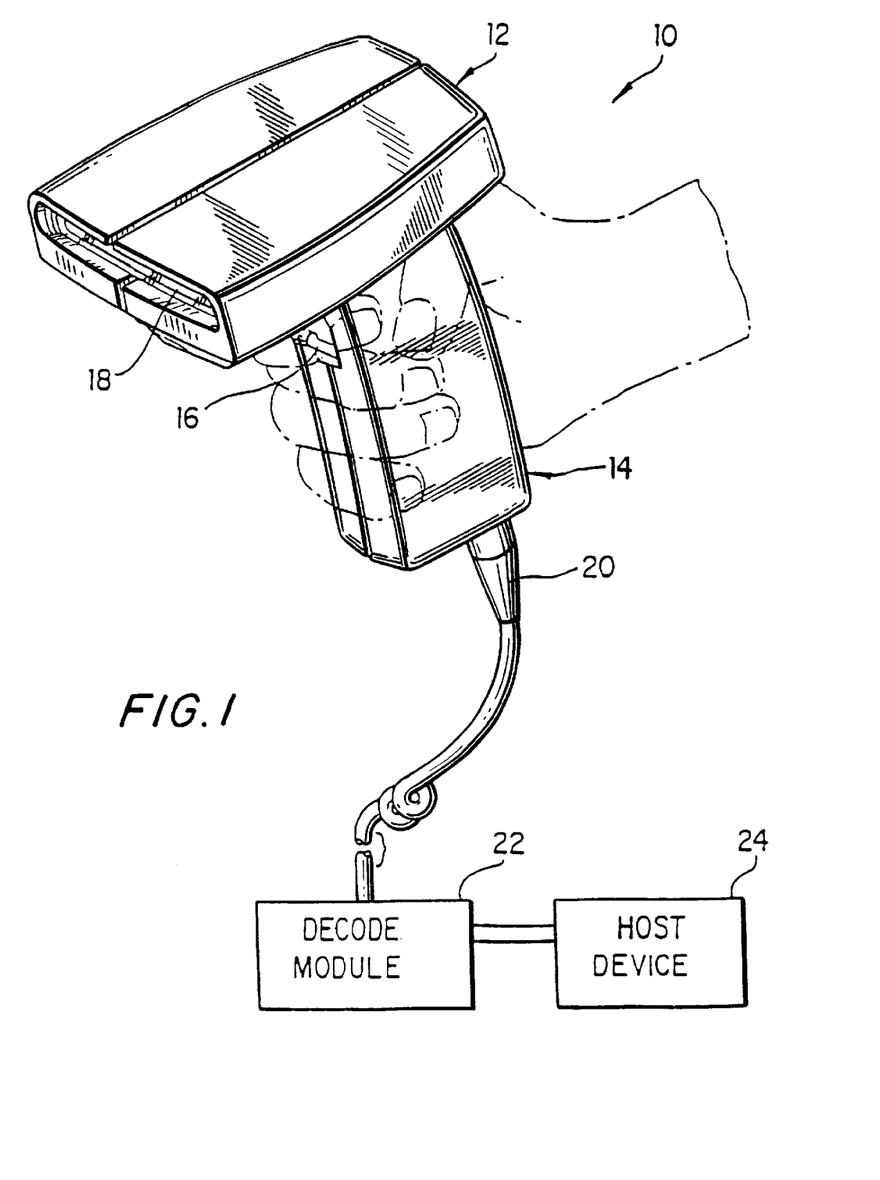
FIG. 1 is a front perspective view of hand-held head employed in a scanner.

Referring now to the drawings, as shown in FIG. 1, reference numeral 10 generally identifies a hand-held, gun-shaped scanner head having a barrel 12 and a handle 14. The head need not be gun-shaped as any suitable configuration may be used, such as box-like. A manually-operable trigger 16 is situated below the barrel 12 on an upper, forwardly-facing part of the handle 14. As known from the above-identified patents and applications incorporated by reference herein, a light source component, typically, but not necessarily, a laser, is mounted inside the head 10. The light source emits a light beam along a transmission path which extends outwardly through a window 18 that faces indicia, e.g. bar code symbols, to be read. Also mounted within the head is a photodetector component, e.g. a photodiode, having a field of view, and operative for collecting reflected light returning through the window 18 along a return path from the symbol.

A scanner component is mounted within the head 10, and is operative for scanning the symbol and/or the field of view of the photodetector. The scanner component includes at least one light reflector positioned in the transmission path and/or the return path. The reflector is driven by an electrically-operated drive to oscillate in alternate circumferential directions, preferably at the resonant frequency of the scanner component.

The photodetector generates an electrical analog signal indicative of the variable intensity of the reflected light. This analog signal is converted into a digital signal by an analog-to-digital converter circuit. This digital signal is conducted, according to one embodiment, along an electrical cable 20 to a decode module 22 located exteriorly of the head 10. The decode module 22 decodes the digital signal into data descriptive of the symbol. An external host device 24, usually a computer, serves mainly as a data storage in which the data generated by the decode module 22 is stored for subsequent processing.

In operation, each time a user wishes to have a symbol read, the user aims the head at the symbol and pulls the trigger 16 to initiate reading of the symbol. The trigger 16 is an electrical switch that actuates the drive means. The symbol is repetitively scanned a plurality of times per second, e.g. 40 times per second. As soon as the symbol has been successfully decoded and read, the scanning action is automatically terminated, thereby enabling the scanner to be directed to the next symbol to be read in its respective turn.

In addition, the head need not be a portable hand held type as fixedly mounted heads are also contemplated in this invention. Furthermore, the heads may have manually operated triggers or may be continuously operated by direct connection to an electrical source.

The oscillations need only last a second or so, since the multiple oscillations, rather than time, increase the probability of getting a successful decode for a symbol, even a poorly printed one. The resonating reflector has a predetermined, predictable, known, generally uniform, angular speed for increased system reliability.

Figure 2:
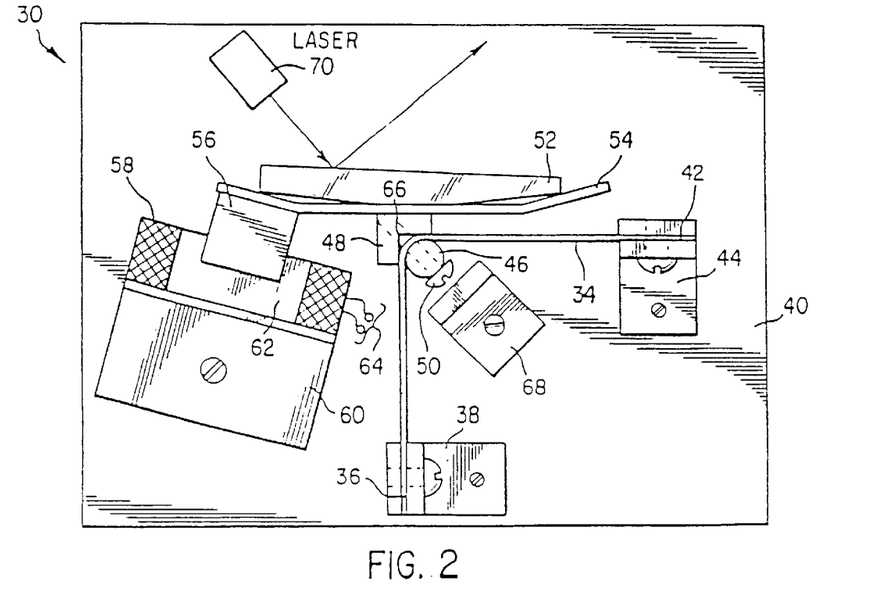
FIG. 2 is a top plan view of a further embodiment of a scanning arrangement according to this invention.

As shown in FIG. 2, one embodiment 30 of a high speed scanning arrangement of the present invention, includes a flexible beam, e.g. a generally planar leaf spring 34. Leaf spring 34 has one end 36 fixedly mounted to an upright of an L-shaped bracket 38 which is anchored to a base support 40. Spring 34 has an opposite end 42 fixedly mounted to an upright of another L-shaped bracket 44 which is anchored to the base support 40. The uprights are oriented at 90° relative to each other. A central portion of the spring 34 is guided around a cylindrical clamping pin 46. The central portion of the spring 34 is clamped between the clamping pin 46 and a bearing surface of a V-block 48 by means of a set screw 50. The clamping pin 46 imparts a 90° bend to the leaf spring at the central portion.

A scanner component, e.g. a light reflector 52, is fixedly mounted to a rear support 54 which, in turn, is fixedly secured to the V-block. The rear support 54 has a permanent magnet 56 mounted at one of its ends. An electromagnetic coil 58 is mounted adjacent the magnet 56 on an upright of another L-shaped bracket 60 which, in turn, is mounted on the base support 40. The coil 58 has a central passage 62 through which the magnet enters with clearance each time a momentary, periodic energizing pulse is applied to input leads 64. The frequency of the energizing pulse is preferably selected at the resonant frequency of $$\frac{1}{2\pi} \frac{\sqrt{K}}{\sqrt{I}}$$

where k equals the spring constant of leaf spring 34, and where I equals the moment of inertia of the magnet/reflector assembly suspended from the leaf spring. The assembly is oscillated about the axis 66. The spring is advantageously constituted of plastic or metal material. Non-metal materials would be more rugged.

In operation, each time the energizing pulse is applied to the coil 58, the magnet 56 is drawn into the passage 62, thereby pulling the reflector 52, the rear support 54, the V-block 48, the clamping pin 46, the set screw 50 thereal-ong. At the same time, the leaf spring is bent. In the illustrated rest position, each arm of the leaf spring is generally planar. Upon being displaced, each arm of the leaf spring is bent, thereby storing energy therein. An L-shaped stop 68 mounted on the base support 40 is located behind the clamping pin 46 to prevent movement of the same past the stop. The pin 46 does not normally engage the stop; it is intended as a safety feature in the event that the arrangement is subjected to external shock forces. The flexible support near the center of rotation of the component provides an excellent shock absorber.

Once bent, the leaf spring 34 releases its stored energy, thereby displacing the magnet/reflector assembly back to and past the rest position. The entire assembly oscillates in a damped manner, until eventually coming to a halt in the rest position. Each arm of the leaf spring alternately assumes a concave and then a convex shape during such oscillation. Light directed from a source, e.g. a laser 70, onto the reflector 52 is swept in one direction in a scan across indicia to be read. Another embodiment of the same configuration utilizes constant amplitude excitation, with continuous oscillation. In this embodiment, the driving signal is a continuously applied AC signal that causes the magnet 56 to be cyclically drawn into the passage 62 and forced out of the passage 62. The spring 34 vibrates to oscillate the reflector 40 between scan end position.

By providing a well defined center of rotation at axis 66 that is close to the scan component, image translation is minimized. In addition, in this configuration the scan pattern stays centered regardless of the scan position.

Figure 3:
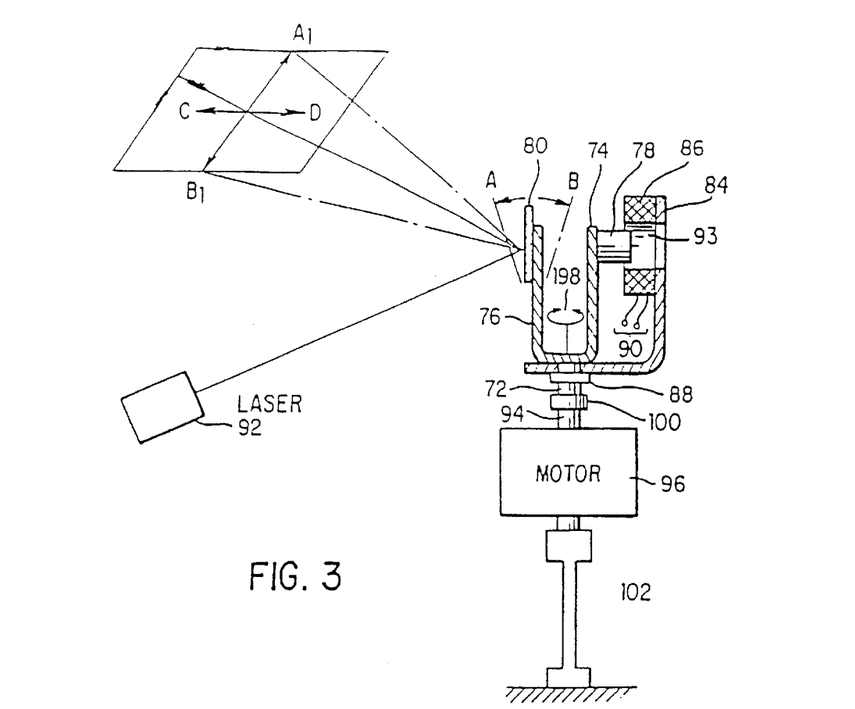
FIG. 3 is a side view of another embodiment of a scanning arrangement according to this invention.

In still another variant, the holder means is a tuning fork which, as shown in FIG. 3, comprises a stem 72 and a pair of arms 74, 76. A permanent magnet 78 is fixedly mounted on arm 74. A scanner component, e.g. a light reflector 80, is fixedly mounted on arm 76. The stem 72 rests on, and extends through, a base support 82 of an L-shaped frame which has an upright support 84 on which an electromagnetic coil 86 is mounted. A fastener 88 secures the stem 72 in an upright orientation to the frame for joint movement therewith. Electrical input leads 90 supply energizing signals to the coil 86.

In operational embodiment, whenever an energizing pulse is supplied to coil 86, the coil draws the magnet 78 into a passage 92 with clearance. When the pulse ends, the tuning fork is caused to vibrate, preferably at the resonance frequency which, as described above, is a function of the moment of inertia of the vibrating mass. The reflector 80 oscillates between the scan end positions A and B. When light emitted from a source, e.g. laser 92, is directed at the reflector 80, a scan line (A1-B1) is formed which extends in one direction. In a second operational embodiment, an AC signal is continuously applied to the coil 86 to cyclically vibrate the arms 74 and 76 to osciallte the reflector 80 between scan end positions. Preferably, the AC signal is tuned to vibrate the fork at the resonance frequency.

In an improved construction, the fork/frame assembly is mounted on an output shaft 94 of a motor 96 of the type described and claimed in U.S. Pat. No. 4,496,831, the contents of which are incorporated herein by reference. Motor 96 is a torque motor operative for displacing output shaft 94 in an amount proportional to the electrical current supplied thereto. Motor 96 repetitively oscillates the output shaft 94 in alternate directions as indicated by the double-headed arrow 98. The output shaft 94 is coupled to the fork stem 72 by a coupler 100.

As shown in FIG. 3, the opposite end of the output shaft 94 is restrained by a centering torsion spring 102. As the output shaft 94 is oscillated, the centering torsion spring 102 operates to return the output shaft 94 to the rest position. A scan line (C-D) is formed which extends in a direction perpendicular to said one direction.

Figure 4:
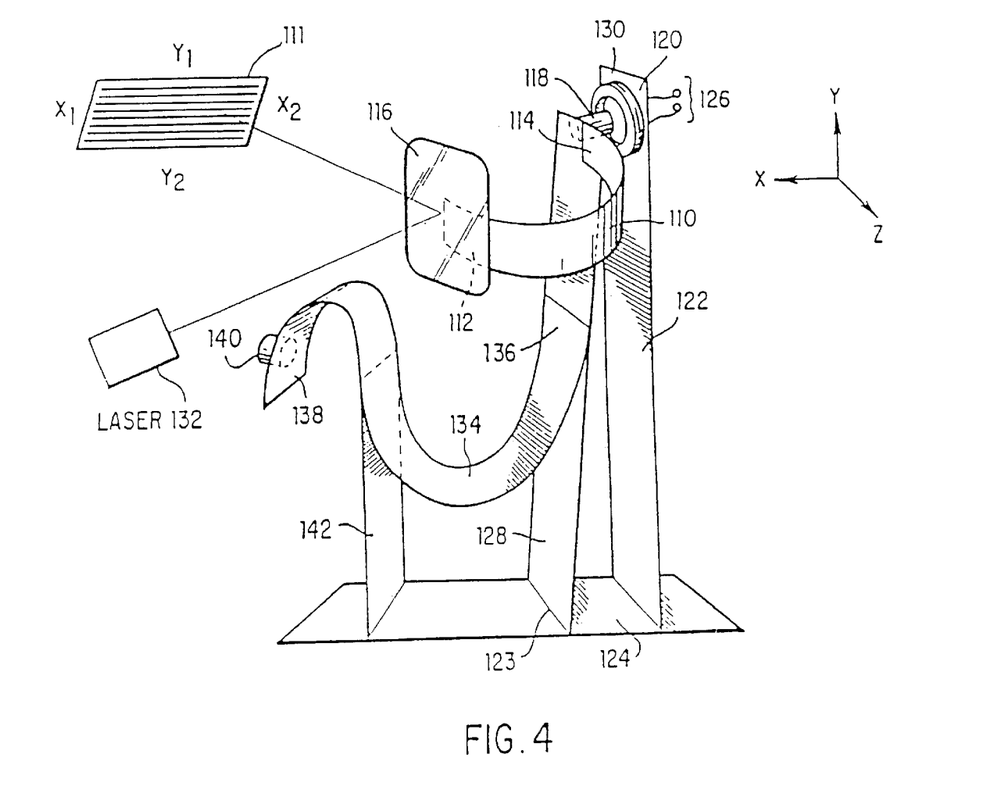
FIG. 4 is a perspective view of yet another embodiment of a scanning arrangement according to this invention.

Another embodiment of a two axis scan pattern arrangement is shown in FIG. 4, in which the holder means includes a U-shaped spring means 110 having a pair of arms 112 and 114. A scanning component, e.g. a light reflector or mirror 116 is fixedly mounted on arm 112 and a permanent magnet 118 is mounted on arm 114. An electromagnetic coil 120 is fixedly mounted to an upright support 122 that is secured to a base 124. Electrical input leads 126 supply the energizing signal to the coil 120. The arm 114 and magnet 118 are secured to a generally planar spring means 128 that is mounted to the base 124. The planar spring 128 may be made of any suitable flexible material, such as, a leaf spring, a flexible metal foil, a flat bar or a Bendix flex-pivot-type spring. The mirror mass, which is equal to the magnet mass, can be in certain cases much higher than the equivalent mass of the U-shaped spring.

In certain applications, it is desirable to scan indicia with a raster-type scan pattern. In a raster-type scan pattern, a series of substantially horizontal and substantially parallel scan lines are produced from an upper horizontal scan line, proceeding downward with a multiplicity of intermediate horizontal scan lines, to a lower horizontal scan line in order to uniformly cover the desired scan area. In order to obtain a raster-type scan pattern, the U-shaped spring 110 and the planar spring 128 are arranged to vibrate in planes orthogonal to each other. As shown in FIG. 4, the arms of the U-shaped spring will vibrate in the x-z plane and the planar spring 128 will vibrate in the x-y plane. By this arrangement of the holder means, the component 116 is mounted for angular oscillating movement, in first and second alternate circumferential directions, between first and second pairs of scan end positions. In addition, due to their respective shapes and positioning, the U-shaped spring 110 will vibrate at a high range of frequencies, typically about 200–800 Hz, while the planar spring 128 will vibrate at a low range of frequencies, typically about 5–100 Hz. The amplitude of vibration necessary to scan the symbol will depend on the size of the symbol and will typically be at least 10°–30° optical.

A raster-type scan pattern is automatically obtained by driving the coil 120 with a signal that is a superposition of two driving signals, one being within the high frequency range and the other being within the low frequency range. For example, a 500 Hz square wave signal may be utilized to oscillate component 116 in the x direction and a 10 Hz sine wave signal may be utilized to oscillate to component 116 in the y direction. The combination of the fast oscillations of the component in the x direction and the slow oscillations of the component in the y direction results in a raster-type scan pattern over the indicia. Preferably, the high frequency signal is frequency tuned to the resonant frequency of the U-shaped spring 110. Typically, the planar spring 128 will be driven below its resonant frequency.

In this arrangement, whenever the superimposed AC driving signal is supplied to coil 120, the coil cyclically draws the magnet 118 into a passage 130 and propels the magnet 118 out of the passage 130. The high frequency component of the driving signal causes the U-shaped spring to vibrate, preferably at the resonant frequency, causing the component 116 to be angularly oscillated between scan end positions X1, X2. The low frequency component of the driving signal causes the planar spring 128 to angularly vibrate towards and away from the support 122 about pivot line 123. During this low frequency vibration, the spring 128 and the fork 110 move as a unit. The vibration of planar spring 128 imparts an angular oscillating movement to the component 116 between scan end positions Y1, Y2. When light emitted from laser 132 is directed at reflector 116 while the U-shaped spring 110 and the planar spring 128 are vibrating simultaneously at the high and low frequencies, respectively, a series of substantially horizontal scan lines 111 in the x direction are produced that are displaced in the y direction thereby forming a raster-type scan pattern.

The arrangement of FIG. 4 is advantageously provided of a very simple construction which utilizes only one driver (one coil and one magnet) for oscillating movement in two directions to form a raster-type scan pattern. There are no shafts or bearings but only flexible metals are used which result in much longer life.

In certain applications, it is desirable to increase the angular amplitude by the scan line produced by the holder. Such an increase in angular amplitude may be attained by constructing the U-shape-d spring 110 with asymmetrically dimensioned arms. In this embodiment, arm 112 is shorter than arm 114 by ratio of at least 2:1. An asymmetrically dimensioned U-shaped spring will result in a longer x direction scan line in the raster-type pattern.

Figure 5:
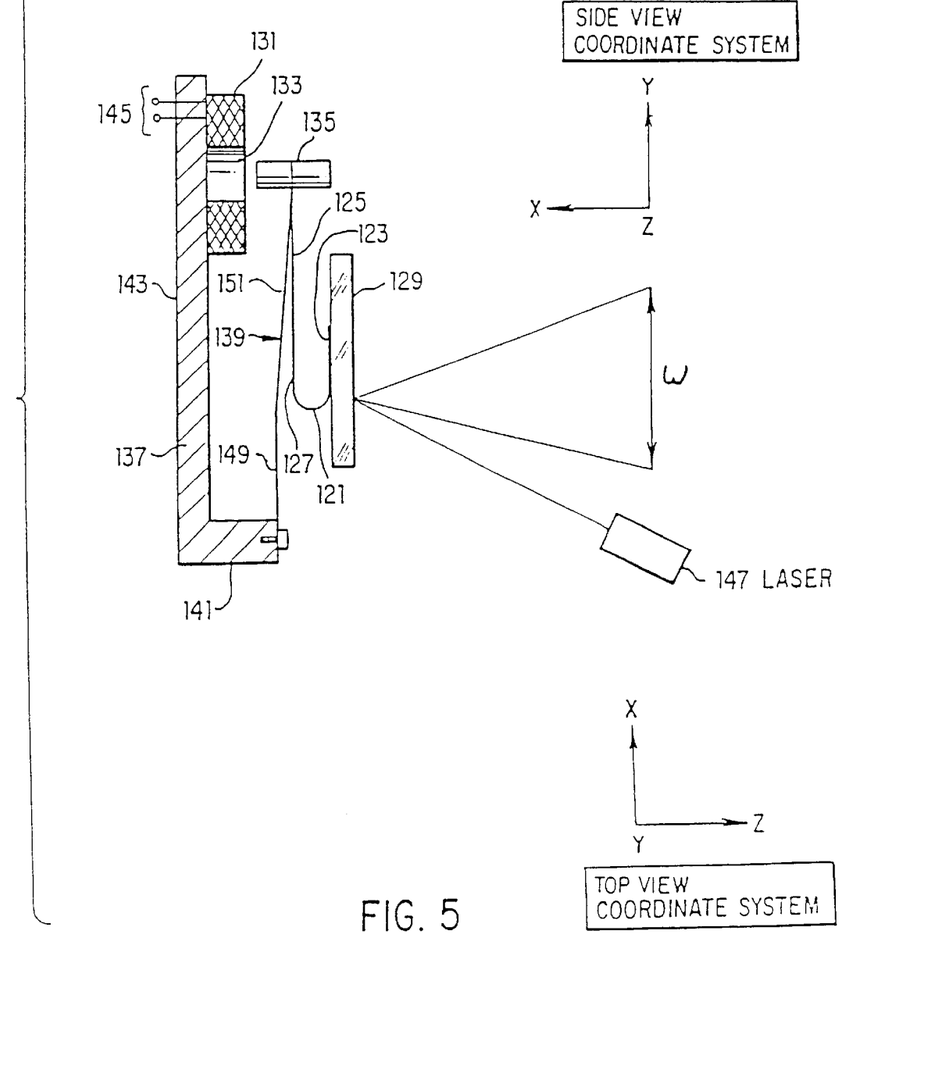
FIG. 5 is a cross-sectional view of a further embodiment of the scanning arrangement according to this invention.

An example of asymmetrically dimensioned U-shaped spring is shown is FIG. 5 in which the tuning fork 121 is constructed having a small dimensioned arm 123 and a large dimensioned arm 125 which results in the nodal point 127 of the spring being positioned on arm 125 rather than at the bottom of the U as with a symmetrically dimensioned spring. As shown in FIG. 5, the component 129 is mounted to arm 123 and the actuator comprises an electromagnetic coil 131 having a passage 133 through which magnet 135 passes with clearance. The U-shaped spring 121 is secured to a support 137 by a planar spring 139. The spring 139 is secured to base section 141 and the coil 131 is mounted to wall section 143. Leads 145 are provided to apply the driving signal to the coil 131 to effect angular movement of the component 129. The asymmetrically dimensioned U-shaped spring 121 provides an increased angular amplitude of the scan resulting from light directed from a laser 147 and reflected from component 129.

In addition to increasing the angular amplitude, which can be as much as a 100% increase over a symmetrically dimensioned spring, the asymmetrically dimensioned U-shaped spring provides a higher durability against metal fatigue and cracking since the nodal point is not at a curved portion of the spring. Also shown in FIG. 5, is a section 149 of spring 139 that is substantially parallel to wall 143 and section 151 angled away from wall 143 while at rest. The angled section 151 as can be seen, provides clearance for the movement of magnet 135 and spring 139. Also, FIG. 5 shows that the spring 121 is held only at the magnet end of the spring, which results in a further increase in the angular amplitude of scan oscillations (as much as 200% higher) over a symmetrically dimensioned U-shaped spring. Another benefit is less vibration being transferred to the base since the U-shaped spring is held only at the magnet end and angular movement of the magnet can be four times lower than that of the scanning component.

The arrangement of FIG. 5 is an elevated view showing the U-shaped spring 121 and the planar spring 139 both positioned for vibration in the x-y plane resulting in a single scan line directed along the y direction. If the U-shaped and planar springs are positioned in orthogonal planes as in FIG. 4, an d an appropriate superimposed high and low frequency driving signal is applied to the coil, a raster-type scan pattern will be provided with an increased x direction angular amplitude.

Referring back to FIG. 4, in an alternative embodiment, the y direction scan vibratory means may also include a generally S shaped planar leaf spring 134 having one arm 136 secured to planar spring 128 and another arm 138 to which is mounted a balance mass 140. An additional generally upright planar spring 142 secures an intermediate portion of the planar spring 134 to the base 124. The S-shaped spring is useful to provide additional support that may be necessary for very large area reflectors.

Figure 6A:
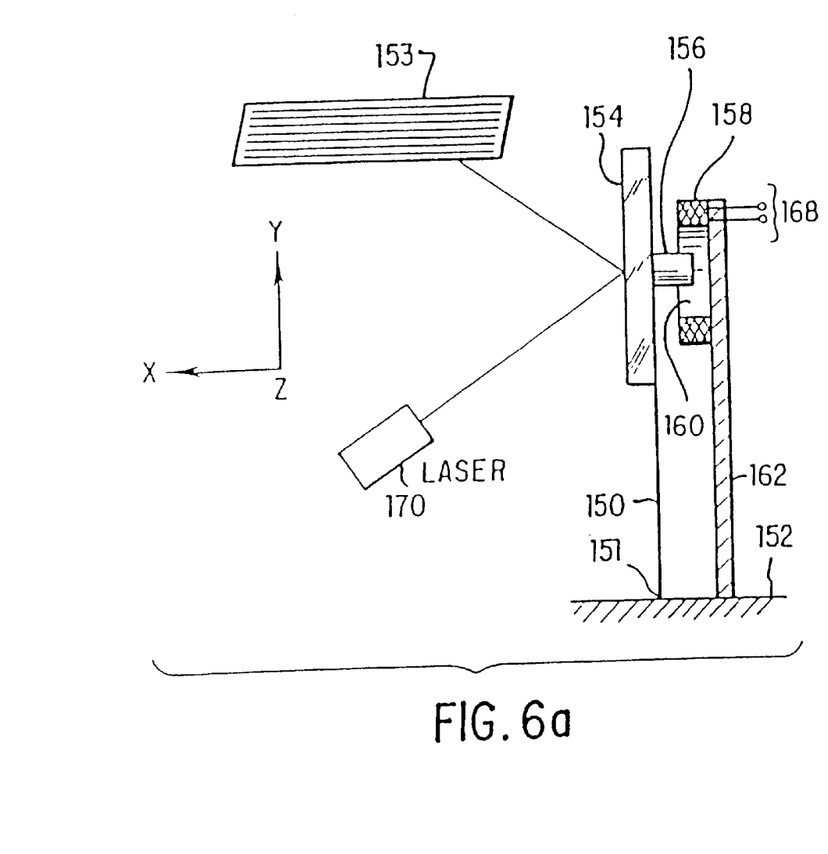
FIGS. 6a and 6b are side and front views of an additional embodiment of the scanning arrangement according to this invention.
Figure 6B:
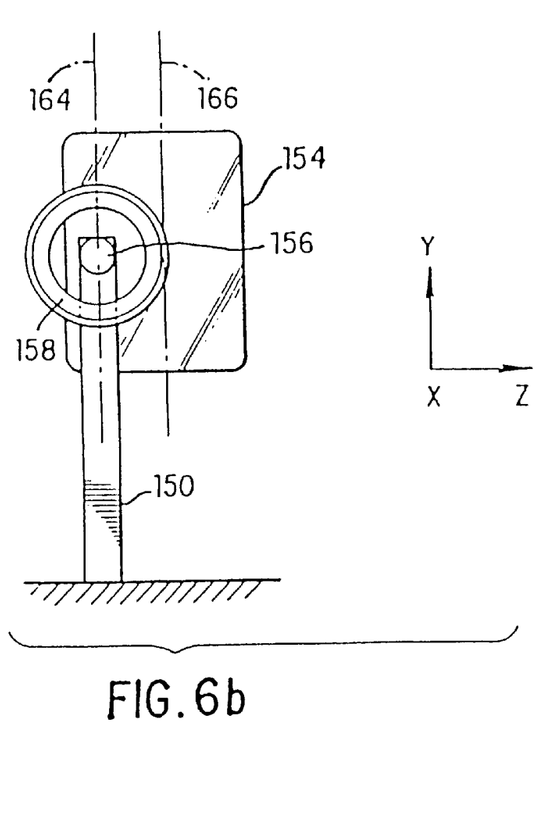

In another embodiment shown in FIGS. 6a and 6b, a single planar spring 150 provides the oscillatory movement in two orthogonal axes for a raster-type scan pattern. The spring 150 is mounted to base 152 and has mounted on it the light reflector 154. A magnet 156 is mounted to the spring 150 on the opposite side as that of the reflector 154. An electromagnetic coil 158 having a passage 160 is mounted adjacent the permanent magnet 156 on an upright bracket member 162 that is in turn mounted to base 152. As shown in FIG. 6b, an axis 164 is formed by the magnet 156 and coil 158 which runs through the center of spring 150. The light reflector 154 is mounted to the planar spring 150 with its center of gravity 166 offset from axis 164.

The raster-type scan pattern is effected by applying a superimposed high and low frequency AC signal to leads 168. In response to the low frequency component (about 20–30 Hz) of the superimposed driving signal, the magnet 156 enters and exits the passage 160 in a cyclical manner which causes the spring 150 to angularly vibrate about pivot line 151. The vibration causes the component 154 to angularly oscillate in the x-y plane which results in a slow y direction scan. In response to the medium-high frequency component (about 50–200 Hz) of the superimposed AC driving signal, the spring 150 is torsionally bent about its axis 164 due to the alignment of the center of gravity of the reflector 154. The offset center of gravity of reflector 154 acts to provide a restoring force to the spring 150 causing torsional vibration of spring 150. The spring 150 is constructed such that when the coil is energized, the component 154 will oscillate angularly at the higher frequency in the x-z plane to provide a fast x directed scan. When light emitted from laser 170 is reflected off of the mirror 154, while the coil 158 is energized, the indicia is scanned in a two axis raster-type scan pattern, consisting of a series of x directed scan lines 153 vertically spaced in the y direction.

The difference in the high and low frequency component of the driving signal produces a large x-directed angular amplitude and a small y-directed angular amplitude resulting in a raster-type scan pattern being developed. The angular amplitude of the x direction scan may be as high as about 90° optical while the angular amplitude of the y direction scan may be up to about 5° optical.

In certain applications, it may be desirable to scan a symbol with an omnidirectional scan pattern. One technique for obtaining an omnidirectional pattern is to position the arrangement of FIG. 5 such that the U-shape d spring vibrates in the x-z plane. Hence, by viewing FIG. 5 as the top view of the arrangement, it can be seen that the material mass of the elements on the right hand side of spring 139 (spring 121 and component 129) is substantially greater than the mass of the elements on the left hand side of spring 139 (magnet 131). This difference in mass provides a weight imbalance that results in a torsional bending of the spring 139 that imparts an angular oscillatory movement of the component 129 in the x-y plane for effecting a y direction scan. In addition, the movement of the spring 139 towards the coil 131 and away from the coil 131 causes the U-shaped spring 121 to vibrate in the x-z plane which imparts an angular oscillatory movement to the component 129 for effecting an x direction scan.

Upon the application the superimposed driving signal, preferably comprised of a pair of sine waves having a frequency ratio in the range of 1.05:1 to 5:1, to leads 145, spring 139 torsionally vibrates at the lower frequency and the U-shaped spring 121 simultaneously vibrates at the higher frequency in such a manner that light will be reflected from the component 129 in a Lissajous scan pattern over the indicia. The Lissajous pattern is provided by the path of the light beam being oscillated in the x and y orthogonal directions in simple harmonic motions at a predetermined ratio of frequencies. Thus, an omnidirectional scan pattern is produced.

Figure 7:
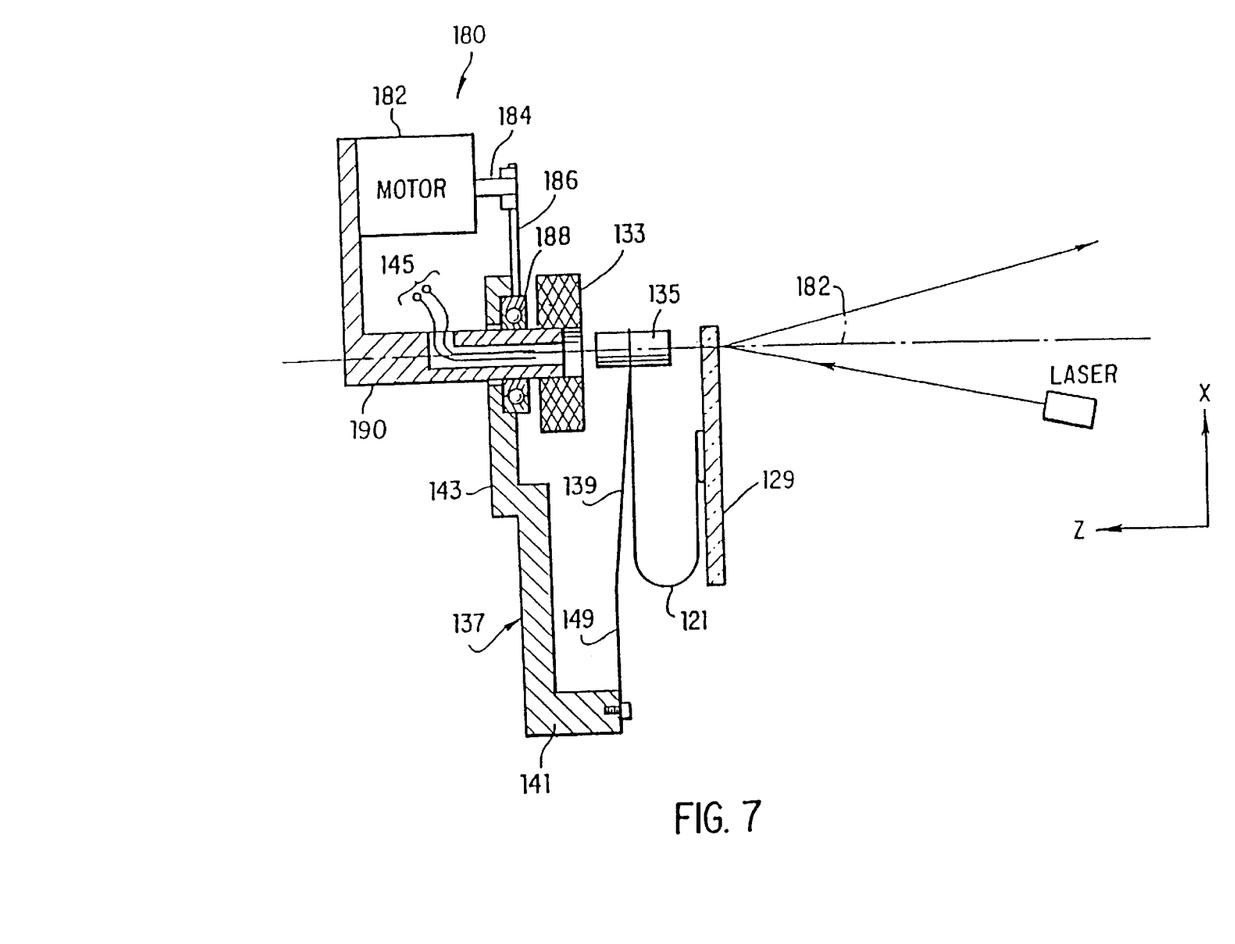
FIG. 7 is a cross-sectional view of yet another embodiment of a scanning arrangement according to this invention.

FIG. 7 shows another technique for producing an omnidirectional scan pattern namely, rotating the entire holder means about an axis. The arrangement shown in FIG. 7 is similar to that of FIG. 5 and like reference numerals are used to identify like parts and a description thereof is not repeated here for the sake of brevity. In order to rotate the entire scanning arrangement, means 180 is provided to rotate the arrangement about an axis 182. The means 180 shown in FIG. 7 is illustrative only as any suitable means for rotating the scanning arrangement about an axis may be employed to effect an omnidirectional scan pattern. The means 180 includes a motor 182 having a shaft 184 for driving a transmission belt 186. Belt 186 is coupled to a shaft (not shown) connected to the support 137 for rotating the support 137 about ball bearing 188 which is attached to support beam 190. The rotation of a single axis direction scan arrangement will produce an omnidirectional scan pattern in the form of a Rosette. The rotation of a two-axis scan arrangement will produce various other omnidirectional patterns depending on the type of two-axis arrangement rotated.

Figure 8:
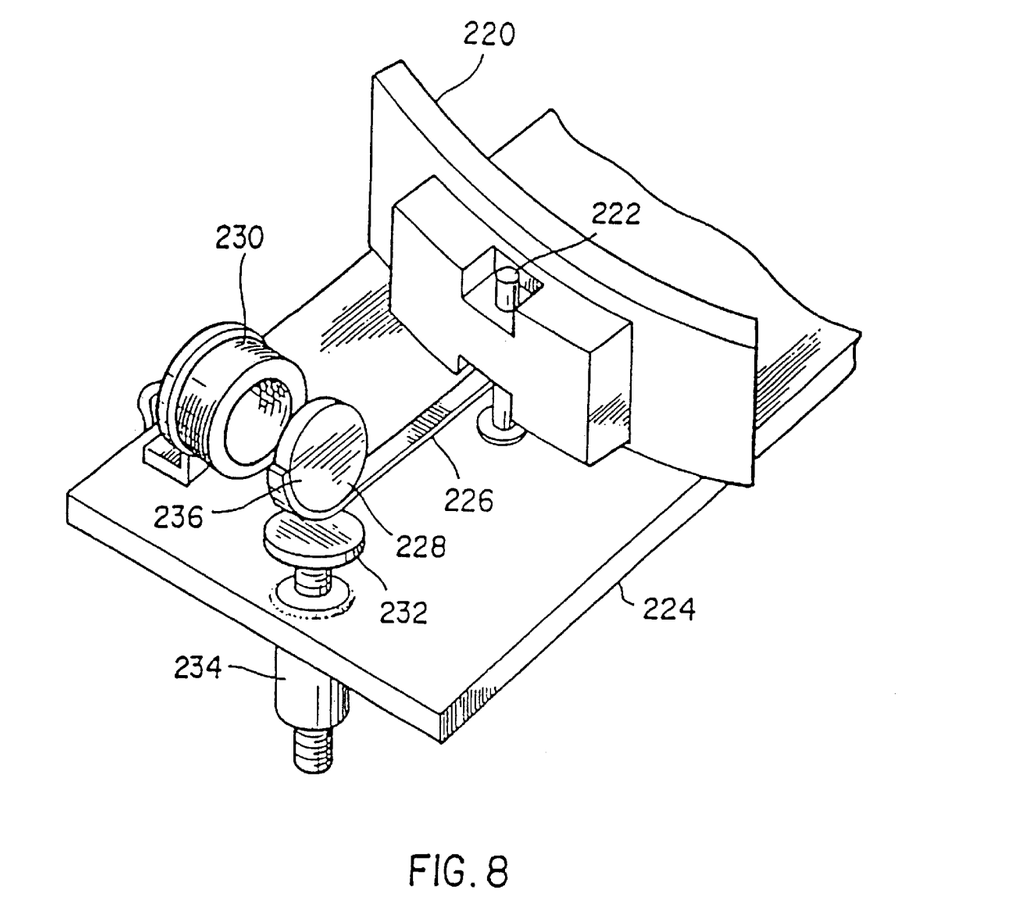
FIG. 8 is a perspective view of an additional embodiment of the scanning arrangement according to this invention.
Figure 9:
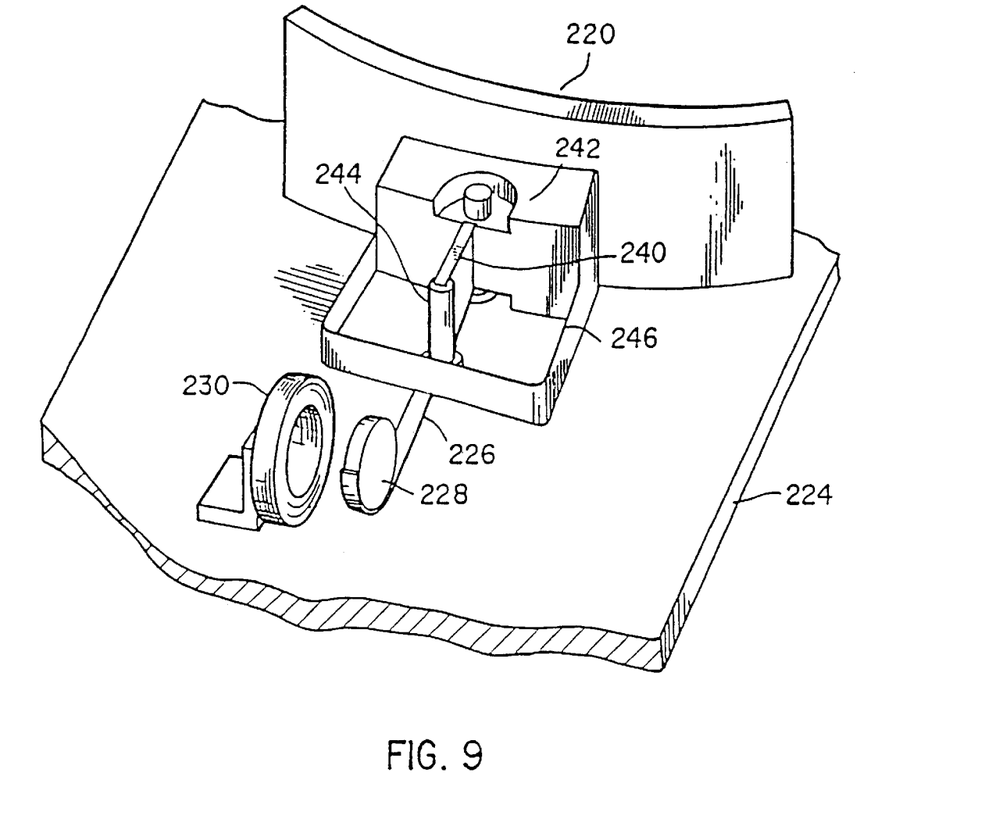
FIG. 9 is a perspective view of a further embodiment of the scanning arrangement according to this invention.

In another embodiment of the present invention as shown in FIG. 8, a magnetically activated return means is provided for effecting a spring like restoring force to oscillate the component between scan end positions. As shown in FIG. 9, a scanning component 220 is mounted for rotational movement about shaft 222 which is rotationally secured to base 224. A support bracket or lever 226 extends from the component 220 and has mounted on the end thereof a permanent magnet 228. An electromagnetic coil 230 is mounted to the base 224 in operational proximity to the permanent magnet 228. A magnetic member 232 is mounted immediately below the permanent magnet 228 on a pem-nut 234. The permanent magnet 228 is a disk or rectangular shaped member in which faces 236 and 238 (not shown) are magnetized to be of opposite magnetic poles. Thus, face 236 may be the north pole and face 238 may be the south pole, or vice versa.

In one embodiment, the magnetic member 232 is made magnetic permeable material such as a soft iron core. The positive and negative current will cause the permanent magnet to alternately be attracted to the coil and repelled from the coil. This will impart an oscillatory angular movement to the scanning mirror 220 between scan end positions. During the oscillatory movement of the component, the permanent magnet 228 will pass over the soft iron core 232 in a back and forth motion. When the coil 230 is de-energized, the magnetic interaction between the magnetic fields of the permanent magnet 228 and soft iron core 232 forces the magnet 228 and, accordingly, the entire moving assembly to align itself with a line of a magnetic equilibrium of the soft core 232, which crosses its center. When the coil 230 is energized, depending on the phase of the AC current, the permanent magnet 228 is either attracted to or repelled from the coil 230 thus magnetizing the core 232 with the polarity opposite to the polarity of the side of the permanent magnet 228 facing the core 232. Since two unlike poles are attracted to each other, this attraction creates a restoring force equivalent to a spring action to cause the component to move towards the equilibrium position. Extreme left and extreme right scan end positions are determined by the relationship between magnitude and phase of the AC current through the coil 230 and the geometry and material of the core 232 which, in turn, determine the value of the restoring torque. When the coil 230 is de-energized, the above described mechanism causes the moving assembly to come to a halt in the rest ("equilibrium") position.

In one alternative of this embodiment, a second electromagnetic coil (not shown) may be provided around core 232 such that member 232 will form the core of the second coil. A DC current energizing the second coil will increase the restoring force of the soft iron core. In a further alternative embodiment, member 232 may be a permanent magnet. If the magnet 228 is mounted with its north pole facing away from the coil, magnet 232 would need to have its south pole facing upward. Magnet 232 must be oppositely arranged if the south pole of magnet 228 is facing away from the coil.

In another embodiment, shown in FIG. 9, in which like parts have like reference numerals of FIG. 8, a restoring force is provided by an elastic member 240. The elastic member 240, may be any suitable material having elastic properties such as rubber, a room temperature vulcanizer (RTV), or any similar plastic. The elastic member 240 is secured to the component 220 by bracket 242, and is also secured to the support 224 by bracket 244. Frame member 246 connects the component 220 to the shaft support 226. The oscillatory movements of component 220 generated by the AC current applied to coil 230 causes RTV 240 to be stretched to its limit to define the scan end positions and upon deactivation of the coil 230, RTV 240 acts to restore the component 220 to its rest position.

It will be understood that each of the elements described above, or two or more together, also may find a useful application in other types of constructions differing from the types described above.

While the invention has been illustrated and described as embodied in a power-saving scanning arrangement, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by letters patent is set forth in the appended claims:

We claim:

1. An arrangement for reading optically encoded indicia, the arrangement comprising:
    a) a scanner component for scanning a light beam across the indicia to be read, the component being mounted to a support for angular oscillating movement with respect to the support in alternate circumferential directions between first and second scan end positions;
    b) means for electromagnetically driving the scanner component in the alternate circumferential directions between said first and second scan end positions, said means including a first permanent magnet which is connected to the oscillating scanner component; and
    c) an element on the support for magnetically interacting with the first permanent magnet so as to urge the first permanent magnet and hence the scanner component to a rest position between said first and second scan end positions.

2. The arrangement as claimed in claim 1, in which the element comprises a soft iron core.

3. The arrangement as claimed in claim 1, in which the element includes an electromagnetic coil.

4. The arrangement as claimed in claim 1, in which the element comprises a further permanent magnet.

5. The arrangement as claimed in claim 1, in which the scanner component is mounted to the support by a shaft which extends along an axis.

6. The arrangement as claimed in claim 1, in which the scanner component includes an elongate lever on which the permanent magnet is mounted.

7. The arrangement as claimed in claim 1, including an adjustment nut for adjusting a position of the element.

8. The arrangement as claimed in claim 1, in which the scanner component includes a reflector for reflecting the light beam.

9. An arrangement for reading optically encoded indicia, the arrangement comprising:

a) a scanner component for scanning a light beam across the indicia to be read, the component being mounted by a shaft to a support for pivoting angular oscillating movement with respect to an axis of the shaft in alternate circumferential directions between first and second scan end positions;

b) means for electromagnetically driving the scanner component in the alternate circumferential directions between said first and second scan end positions, said means including a first magnet which is connected to the oscillating scanner component; and c) a drive element on the support for magnetically interacting with the first magnet so as to impart a force to the first magnet and hence move the scanner component from a rest position to at least one of said first and second scan end positions.

10. The arrangement as claimed in claim 9, further comprising a restoring element on the support for urging the first magnet to the rest position.

11. The arrangement as claimed in claim 9, further comprising a radial arm having one end connected to the scanner component, and another end connected to the first magnet.

* * * * *